US008300774B2

(12) United States Patent
Kochanowska

(10) Patent No.: US 8,300,774 B2
(45) Date of Patent: Oct. 30, 2012

(54) METHOD FOR OPERATING A VOICE MAIL SYSTEM

(75) Inventor: Dorota Kochanowska, Hamburg (DE)

(73) Assignee: Avaya GmbH & Co. KG (DE)

(*) Notice: Subject to any disclaimer, the term of this patent is extended or adjusted under 35 U.S.C. 154(b) by 1440 days.

(21) Appl. No.: 11/851,824

(22) Filed: Sep. 7, 2007

(65) Prior Publication Data

US 2008/0304633 A1 Dec. 11, 2008

(30) Foreign Application Priority Data

Jun. 11, 2007 (DE) .......................... 10 2007 027 363

(51) Int. Cl.
*H04M 1/64* (2006.01)
*H04L 12/58* (2006.01)
*G10L 15/14* (2006.01)

(52) U.S. Cl. ............... 379/88.08; 379/32.01; 379/88.03; 379/88.14; 455/419; 704/235; 704/251; 704/256; 704/260; 709/206; 709/221; 709/227

(58) Field of Classification Search ............... 379/32.01, 379/88.03, 88.08, 88.14; 455/419; 704/235, 704/251, 256, 260; 709/206, 221, 227
See application file for complete search history.

(56) References Cited

U.S. PATENT DOCUMENTS

| | | | | |
|---|---|---|---|---|
| 5,333,266 A * | 7/1994 | Boaz et al. | ..................... | 709/206 |
| 6,182,041 B1 * | 1/2001 | Li et al. | ......................... | 704/260 |
| 6,219,638 B1 * | 4/2001 | Padmanabhan et al. | ....... | 704/235 |
| 6,438,217 B1 * | 8/2002 | Huna | .......................... | 379/88.14 |
| 6,587,871 B1 | 7/2003 | Schrader | | |
| 7,024,360 B2 * | 4/2006 | Savic et al. | ..................... | 704/256 |
| 7,027,808 B2 * | 4/2006 | Wesby | .......................... | 455/419 |
| 7,133,504 B2 * | 11/2006 | Fostick | ....................... | 379/88.14 |
| 7,177,402 B2 * | 2/2007 | Metcalf | ....................... | 379/88.03 |
| 7,702,792 B2 * | 4/2010 | Shaffer et al. | .................. | 709/227 |
| 7,970,106 B2 * | 6/2011 | Bettis et al. | .................. | 379/32.01 |
| 8,051,134 B1 * | 11/2011 | Begeja et al. | .................. | 709/206 |
| 8,184,780 B2 * | 5/2012 | Siminoff | ..................... | 379/88.14 |
| 8,214,469 B2 * | 7/2012 | Alperin et al. | ................. | 709/221 |
| 2002/0159572 A1 | 10/2002 | Fostick | | |
| 2004/0057561 A1 | 3/2004 | Gilbert | | |
| 2005/0163289 A1 | 7/2005 | Caspi et al. | | |
| 2007/0127631 A1 * | 6/2007 | Difiglia | ........................ | 379/67.1 |
| 2008/0304633 A1 * | 12/2008 | Kochanowska | ............. | 379/88.08 |

FOREIGN PATENT DOCUMENTS

| | | |
|---|---|---|
| DE | 10032828 | 1/2002 |
| DE | 102004050785 | 5/2006 |
| EP | 0586954 | 3/1994 |
| EP | 1014277 | 6/2000 |
| EP | 1339206 | 8/2003 |
| GB | 2334404 | 8/1999 |
| WO | WO 01/42875 | 6/2001 |
| WO | WO 01/69905 | 9/2001 |
| WO | WO 02/31814 | 4/2002 |

* cited by examiner

Primary Examiner — Gerald Gauthier

(74) Attorney, Agent, or Firm — Sheridan Ross P.C.

(57) ABSTRACT

A method for operating a voice mail system connected to a telecommunication system, having a recorder with a message storage connected thereto, shall enable a particularly flexible use of a speech message stored in the voice mail system. For this purpose, according to the invention, a speech message collected by the recorder, storable as a speech information in the message storage is converted by means of a speech-to-text conversion module into a text message.

14 Claims, 1 Drawing Sheet

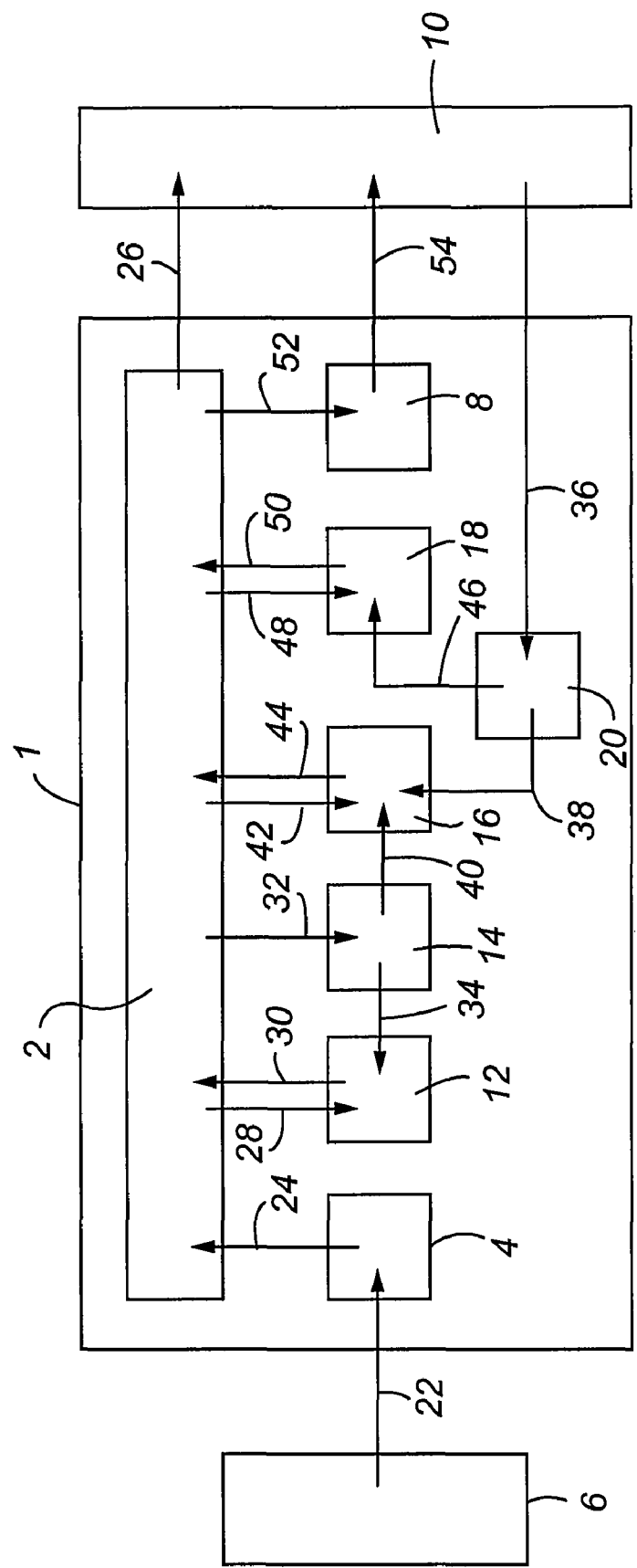

METHOD FOR OPERATING A VOICE MAIL SYSTEM

FIELD OF THE INVENTION

The invention relates generally to the operation of a voice mail system and particularly to a voice mail system connected to a telecommunication system.

BACKGROUND OF THE INVENTION

The invention refers to a method for operating a voice mail system connected to a telecommunication system, comprising a recorder with a message storage connected thereto.

In large telecommunication systems, which may comprise in particular a plurality of terminals or extension, voice mail systems (also called automatic answering machine) are often connected via a private automatic branch exchange to the telephone network and serve for receiving incoming calls when the recipient or party concerned is absent or busy. When the calling party is forwarded to the voice mail system, he is greeted first of all and then asked to leave a message. With most systems, the greeting can be configured individually for each calling party and can in particular consist in mentioning his name. For the storage of the message, after the greeting, which is usually initiated by a suitable signal in the manner of a request, the voice mail system comprises as a rule a recorder with which a message storage is connected in the manner of a mailbox of the respect-tive user. The recipient of the call can, therefore, start the voice mail system later in order to hear the messages stored in the mailbox.

The recall of the speech message stored in the voice mail system is, however, too unpracticable for further use and evaluation of the information contained in the speech message, especially in case of commercial use of the voice mail system. The recipient of the speech message is not in a position to edit the information in a suitable manner and to integrate it into his existing information and communication system.

Therefore, the invention is based on the problem to provide a suitable method for operating a voice mail system, with the help of which the recipient can use in a particularly flexible way a speech message stored in the voice mail system.

The problem is solved by the invention by converting a speech message collected by the recorder, storable as a speech information in the message storage by means of a speech-to-text conversion module into a text message.

SUMMARY OF THE INVENTION

The invention is based on the idea that for a flexible utilization of the speech message stored on a voice mail system, the speech message should be as compatible as possible with other programs and users and should, therefore, be stored in the voice mail system in a standardized format. Due to the fact that this is not the case with a speech file, the speech message stored in the voice mail system should, therefore, by transformed into another, common format. As the new for-mat, in which the speech shall be stored, should be compatible with a large number of programs, it is in particular desirable to store the speech message in text form. Therefore, to enable the storage of a speech message in text format, a speech-to-text conversion module is used, converting the speech message into a text message. The speech-to-text conversion module can be available in particular in the form of a so-called speech-to-text program.

To enable the recipient to recall the text message in a suitable way, the message is advantageously stored in the message storage of the voice mail system. This enables the user to recall the text message also at a later date or also several times.

For a reliable functioning of the speech-to-text conversion module, first of all the language in which the speech message was stored is determined in an advantageous embodiment. Then, a conversion module suitable for the determined language can be chosen, for example from a number of modules stored in the manner of a module library. To determine the language, preferably a speech recogni-tion module is used which determines first of all the language of the speech message received on the voice mail system and then suitably selects the speech-to-text conversion module with this recognized language.

As part of the globalization and the meanwhile worldwide extension of the telecommunication network, increasingly connections occur via the telecommunication network between two parties of different linguistic origin. It is not always pos-sible for the two parties to agree upon a common language. Problems of language increasingly occur above all, when the person called is absent and the calling party is forwarded to the automatic answering machine. Messages stored in a for-eign language on the answering machine of the person called are, therefore, not understandable to that person. Important business or private information might be lost.

The evaluation and analysis of the text messages stored in the voice mail system through the user requires, however, that the user understands the language in which the text message was spoken. Should this not be the case, which occurs more and more often within the framework of globalization, above all with busi-ness contacts, a translation module is advantageously integrated in the voice mail system. To select a suitable program among a number of available translation programs from the translation module, the language of the text message determined by the speech recognition module, on the one hand, and the user's native language, specifiable by him, on the other hand, are transmitted to the translation module. To enable a read-out as required or an evaluation of the translated text message at a later date, the message is advantageously stored in the message storage of the voice mail system.

To enable a particularly flexible recall of the message, the latter is expediently transformed into a format which is suitable for that purpose. In particular if no further evaluation or analysis of the translated text message stored in the message storage of the voice mail system is desired by the user, this transformation can suitably be effected, in view of a recall of the message, for example by remote access. In a particularly advantageous manner, the translated text message is converted into a speech message by means of a text-to-speech conversion module. To enable a recall of the message by the user, this translated speech message is preferably stored in the message storage of the voice mail system. To en-able the recipient to recall this message at any time, the translated speech message is advantageously sent to a monitoring device integrated into the voice mail system, through which the user can receive the message.

The advantages achieved with the invention consist in particular in the fact that the conversion of the received speech message into a text message offers particularly far-reaching possibilities of access to, and pre-procesing of, the stored message. A user of a voice mail system can in particular recall speech messages addressed to him in the form of text messages in a particularly simple manner and can, therefore, suitably process them. Furthermore, these text messages are stored in a language understandable to him or even offered to him as a speech information, although the original message might have been worded in a language not understandable to him. In particular in view of international business contacts or also private relations, this is a decisive advantage, because no external translations are necessary or no individual speech informations will be lost for remain-ing unintelligible to the user.

BRIEF DESCRIPTION OF THE DRAWINGS

The FIGURE is a block diagram of an embodiment of the invention.

DETAILED DESCRIPTION

The FIGURE schematically depicts one exemplary embodiment of the invention.

Voice mail system 1 is composed of a plurality of units, the voice mail system 1 comprising a message storage 2 in which both speech messages and text messages can be stored. Furthermore, the voice mail system 1 comprises a recorder 4 receiving the speech message sent by a calling party 6. In addition, the voice mail system 1 comprises a monitoring device 8 by means of which the user 10 can receive the speech messages.

In the voice mail system 1, several program units or modules are integrated for a suitable processing of the messages stored in the message storage 2. These units include, among others, a speech-to-text conversion module 12 designed as a speech-to-text program, offering the possibility to convert a speech message into a text message. Furthermore, a speech recognition module 14, with the help of which the language of a speech message can be determined, a translation module 16, which can translate a text message into a second text message in an-other language, and finally a text-to-speech conversion module 18, which converts a text message into a speech message, are provided. In addition, the voice mail system 1 comprises a system unit 20, which stores user-specific information, such as, for example, the user's native language.

Such a voice mail system 1 receives via the recorder 4 a message sent by a calling party 6, the transmission being represented by an arrow 22. Then, the recorder 4 stores the message received, which is represented by the arrow 24, together with further identification data, such as, for example, the telephone number of the calling party 6 or the current hour, in a message storage 2. This message can afterwards be monitored by the user 10, which is symbolized by the arrow 26. Depending on the intended use of the message stored in the message storage 2, it is, however, also possible to convert the speech message into a text message. In this case, the message is requested by the speech-to-text conversion module 12, which is symbolized by the arrow 28, is transformed into a text file and stored again in the message storage 2, which is represented by the arrow 30. To enable a suitable selection of the speech-to-text conversion module 12, the speech message is examined as to its language by means of the speech recognition module 14. For this purpose, the speech message is read from the message storage 2 into the speech recognition module 14, which is symbolized by the arrow 32, and, after final determination of the language, it is sent to the speech-to-text conversion module 12, which is represented by the arrow 34. The language of the speech message can be determined, for example, by means of a "key-word spotting" method, with which it is possible to select from a number of speech-to-text programs in the speech-to-text conversion module 12 the appro-priate one and to convert the speech message in the language in which it is worded, into a text message and to store it in the message storage 2. This text message can be recalled by the user 10 for further evaluation.

Should the text message be worded in a language unintelligible for the user 10, it can be translated by means of the translation module 16 into a language which can be specified or adjusted by the user 10, which is represented by the arrow 36. For this purpose, the system unit 20 informs the translation module 16 of the language chosen by the user 10, which is symbolized by the arrow 38, and in addition, the speech recognition module 14 informs the translation module 16 of the language in which the text message is available in the message storage 2, which is represented by the arrow 40. Therefore, the translation module 16 reads in the text message from the message storage 2, which is represented by the arrow 42, translates it from the original language into the target language and stores the new text file in the message storage 2, which is represented by the arrow 44. This text message translated into a language understandable to the user 10 can be recalled and processed by the user 10.

To increase operating convenience and availability, the translated text message in the message storage 2 can be transformed into the language desired by the user 10 by means of the text-to-speech conversion module 18 into a speech message. For this purpose, the system unit 20 sends the language in which the translated text message is worded to the text-to-speech conversion module 18, which is represented by the arrow 46. Then, the text message is read in by the text-to-speech conversion module 18, which is symbolized through the arrow 48, and according to the language, a text-to-speech program is selected from a number of available programs. This text-to-speech program transforms the text message into a speech message in the desired language, which is then stored in the message storage 2 by the text-to-speech conversion module, which is represented by the arrow 50. The user 10 can then receive the translated speech message through the monitoring device 8. For this purpose, the speech message is sent to the monitoring device 8 by the message storage 2, which is represented by the arrow 52, and is then forwarded to the user 10, which is represented by the arrow 54.

The user 10 is offered many possibilities of processing the incoming message. He can, with the help of the voice mail system 1, receive speech information addressed to him both acoustically in the original language of the calling party 6 and in a language specifiable by him, as well as in the form of a text message for sim-ple processing.

A number of variations and modifications of the invention can be used. It would be possible to provide for some features of the invention without providing others.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method for operating a voice mail system connected to a telecommunication system, comprising:
    providing a message store, wherein the message store is operable to store both voice mail messages and text messages;
    providing a recorder, the recorder connected with the message store;
    collecting, by the recorder, a speech message, the speech message being storable as a speech information in the message storage;
    storing the collected speech message as speech information in the message storage;
    converting, by a speech-to-text conversion module, the collected speech message into a text;
    determining a first language of the text message;
    the translation module determining a second language of a recipient;
    the translation module determining if the first language is unintelligible to the recipient based on the first language; and
    if the first language is unintelligible to the recipient, the translation module translating the text message from the first language to the second language.

2. Method according to claim 1, wherein the text message is stored in the message storage.

3. Method according to claim 1, wherein a speech recognition module determines the first language of the speech message and selects a speech-to-text conversion module from among a plurality of speech-to-text modules, each module corresponding to a different language.

4. Method according claim 1, wherein the text message is translated by means of a translation module into a specifiable language.

5. Method according to claim 4, wherein the translated text message is stored in the message storage.

6. Method according to claim 4, wherein the translated text message is converted by a text-to-speech conversion module into a speech message.

7. Method according to claim 6, wherein the translated speech message is stored in the message storage.

8. Method according to claim 7, wherein the translated speech message is read out and transmitted to a user.

9. Method according to claim 2, wherein a speech recognition module determines the language of the speech message and suitably selects by means of the language the proper speech-to-text conversion module from among a plurality of differing speech-to-text modules, each module corresponding to a different language.

10. Method according to claim 2, wherein the text message is translated by means of a translation module into a specifiable language.

11. Method according to claim 3, wherein the text message is translated by means of a translation module into a specifiable language.

12. Method according to claim 5, wherein the translated text message is converted by a text-to-speech conversion module into a speech message.

13. A computer readable medium comprising processor executable instructions to perform the steps of claim 1.

14. A voice mail system operable to perform the steps of claim 1.

* * * * *

UNITED STATES PATENT AND TRADEMARK OFFICE
CERTIFICATE OF CORRECTION

PATENT NO. : 8,300,774 B2
APPLICATION NO. : 11/851824
DATED : October 30, 2012
INVENTOR(S) : Dorota Kochanowska Page 1 of 1

It is certified that error appears in the above-identified patent and that said Letters Patent is hereby corrected as shown below:

In the Claims:

Column 5, line 35, please delete "storage" and insert --store--.

Column 5, line 37, please delete "storage" and insert --store--.

Column 5, line 39, please insert --message-- after 'text'.

Column 5, line 41, please delete "the" and insert --a--.

Column 6, line 12, please delete the first occurrence of "a" and insert --the--.

Column 6, line 17, please delete "a" and insert --the--.

Column 6, line 30, please delete the first occurrence of "a" and insert --the--.

Column 6, line 33, please delete the first occurrence of "a" and insert --the--.

Column 6, line 38, please insert --non-transient-- between 'A' and 'computer'.

Signed and Sealed this
Twenty-first Day of May, 2013

Teresa Stanek Rea
*Acting Director of the United States Patent and Trademark Office*